United States Patent [19]

Isaoka et al.

[11] 3,931,122

[45] Jan. 6, 1976

[54] METHOD FOR PRODUCING HIGH MOLECULAR WEIGHT POLYACRYLAMIDE TYPE RESINS

[75] Inventors: Shin-ichi Isaoka, Kyoto; Tutomu Shintani, Toyonaka; Shigenori Taziri, Ibaraki; Shiro Sakai, Higashiosaka; Wataru Thoma, Yamatotakada, all of Japan

[73] Assignee: Sumitomo Chemical Company, Limited, Japan

[22] Filed: Jan. 24, 1974

[21] Appl. No.: 436,046

[30] Foreign Application Priority Data
Jan. 25, 1973  Japan.............................. 48-10861

[52] U.S. Cl...... 260/80.3 N; 210/54; 260/85.5 AM; 260/85.5 M; 260/85.5 L
[51] Int. Cl.².......................... C08F 2/14; C08F 2/20
[58] Field of Search..... 260/89.7 R, 80.3 N, 85.5 R, 260/85.5 AM, 85.5 M, 85.5 L

[56] References Cited
UNITED STATES PATENTS

| | | | |
|---|---|---|---|
| 3,414,514 | 12/1968 | Buhl | 260/89.7 R |
| 3,480,761 | 11/1969 | Kolodny et al. | 260/89.7 R |
| 3,509,113 | 4/1970 | Monagle et al. | 260/89.7 R |

*Primary Examiner*—Edward J. Smith
*Attorney, Agent, or Firm*—Stewart and Kolasch, Ltd.

[57] ABSTRACT

High molecular weight acrylamide polymers useful as flocculants are obtained by copolymerizing acrylamide with a monovinyl monomer in a mixture of water and acetone in the presence of a redox type catalyst comprising a persulfate, an aliphatic amine and at least one Lewis acid selected from the group consisting of chlorides and bromides of aluminum, antimony, lithium and zinc.

3 Claims, No Drawings

METHOD FOR PRODUCING HIGH MOLECULAR WEIGHT POLYACRYLAMIDE TYPE RESINS

The present invention relates to a method for producing resinous acrylamide polymers of high molecular weight, which are useful as highly effective polymer flocculants.

Removal of solid fine particles from aqueous suspensions thereof by tight flocculation is very essential to improvement of the efficiency of various processes, for example, clarificiation of waste water, and sedimentation and filtration of suspended materials, as involved in a water and sewage treatment, and in the mining and chemical industries. Therefore, it has been in an increasing demand to provide chemicals effective for these purposes.

There have been used various types of flocculants for these purposes, among which the most typical are polyacrylamide type flocculants, which are effective for flocculation of various types of suspended particles, and particularly the anionic type is remarkably effective in the flocculation of positively charged solid particles, for example, in the sedimentation and filtration of magnesium hydroxide for producing magnesia from sea water. The flocculants, however, have been required to have a high molecular weight as the flocculating power tends to be directly proportional to the molecular weight.

It is well known that the prior synthetic methods of producing polyacrylamides can be classified into two processes, i.e. an aqueous solution polymerization and a precipitation polymerization. The former is the most suitable synthetic process for preparing high molecular weight polymers. However, this process has the disadvantage of providing a highly viscous polymer solution which is difficult to handle as well as a troublesome operation for obtaining the polymers. On the other hand, the latter process is superior to the former in the production of powdered products. However, it is difficult to obtain high molecular weight polymers because the chain transfer of solvents occurs therewith.

As is well known, the molecular weight of polymers produced in a vinyl polymerization is proportional directly to the monomer concentration and inversely to the square root of the catalyst concentration and the polymerization temperature, and it is therefore natural that high molecular weight polymers can more advantageously be produced by the polymerization at a higher concentration of monomer, a lower concentration of catalyst and a lower temperature.

In the precipitation polymerization procedure, there exist certain restrictions as to monomer concentration, polymerization temperature and catalyst concentration in order to keep a mainly stable slurry and a suitable reactivity.

The inventors have studied methods for the production of high molecular weight polymers with great ease in order to improve the above disadvantages in the conventional precipitation polymerization process which comprises polymerizing vinyl monomers in a solvent such as acetone, ethyl acetate and t-butanol in the presence of a catalyst such as a mixture of persulfates and amines, or a reducing agent such as sodium thiosulfate. As the result, the inventors have found that high molecular weight acrylamide polymers can be obtained in powder form by using as the catalyst a redox type catalyst comprising a persulfate, an aliphatic amine and at least one Lewis acid selected from the group consisting of the chlorides and bromides of aluminum, antimony, lithium and zinc.

According to the present invention, there is provided a process for producing resinous acrylamide polymers, which comprises copolymerizing acrylamide with a monovinyl monomer in a mixture of water and acetone in the presence of a redox type catalyst comprising a persulfate, an aliphatic amine and at least one Lewis acid selected from the group consisting of the chlorides and bromides of aluminum, antimony, lithium and zinc.

In the process of the invention, the slurry produced can be kept stable even at a higher monomer concentration, a lower polymerization temperature and a lower catalyst concentration, compared with those of the conventional precipitation polymerization, so that the objective high molecular weight polymers can be obtained in high yields.

Examples of the monovinyl monomer to be used in the present invention include acrylonitrile, acrylic acid and its salts, methacrylic acid and its salts, vinylpyridine, etc. Particularly preferred is acrylic acid. Although acrylamide may be used in combination with one or more of these monovinyl monomers in any optional proportion, its use as a major component, for example, in an amount of 65 to 99 percent by weight based on the total amount of acrylamide and the monovinyl monomer, is preferred.

The amounts of acrylamide and of the monovinyl monomer in the reaction system are not essential and may be appropriately selected. From the practical viewpoint, however, the total amount of acrylamide and the monovinyl monomer may be usually from 20 to 30 percent by weight based on the total amount of the reaction mixture.

As for the components in the redox type catalyst, the persulfate may be, for example, potassium persulfate, sodium persulfate or ammonium persulfate. The aliphatic amine may be dimethylaminoethanol, triethanolamine, hexamethylene diamine, diethylene triamine, triethylene tetramine, tetraethylene pentamine, polyethylenimine, tetramethylethylene diamine, tetramethylpropylene diamine, tetramethylhexamethylene diamine or the like.

In the redox type catalyst, the proportion of the aliphatic amine and the persulfate may be from 0.5 : 1 to 2.5 : 1 in weight. Further, the promotion of the Lewis acid and the aliphatic amine may be from 0.5 : 1 to 3.0 : 1 in weight. The amount of the redox type catalyst, i.e. the total amount of the said essential components, is usually from 0.01 to 1.0 percent by weight based on the total weight of acrylamide and the monovinyl monomer before polymerization.

The solvent used preferably as the reaction medium in the process of this invention is a mixture of water and acetone containing 23 to 30 percent by weight of acetone.

The amount of the solvent in the reaction mixture is not limitative. However, it is generally preferred, from the standpoints of slurry stability and handling of slurry, to carry out the polymerization using the solvent in an amount of 70 to 80 percent by weight based on the total weight of the reaction mixture.

When desired, there may be used any dispersing agent in the polymerization. Among various dispersing agents, the most preferred is polyvinyl alcohol. The amount of the dispersing agent may be from 0.1 to 4 percent by weight based on the total weight of the reaction mixture.

The polymers of the present invention containing high molecular weight acrylamide polymers as a major component show an extremely superior flocculation property.

Practical and presently preferred embodiments of the present invention are illustratively shown in the following Examples, which are not to be interpreted as limiting.

EXAMPLE 1

Acrylic acid (2.7 g) was dissolved in 200 g of water while stirring and neutralized with about 2.6 ml of a 10N aqueous solution of sodium hydroxide at 35°C. Then, 213 g of acrylamide, 307 g of water and 215 g of acetone were dissolved in the resulting solution, and thereafter 40 g of a 5 percent aqueous solution of polyvinyl alcohol and 0.2 g of zinc chloride were added thereto. After replacement of the atmosphere in the reaction vessel by nitrogen gas, 10 ml of a 1 percent aqueous solution of potassium persulfate and 10 ml of a 2 percent aqueous solution of dimethylaminoethanol were further added thereto. The reaction system which was first a homogeneous and clear solution became gradually turbid white. The polymerization was allowed to proceed at 10°C for 8 hours. After the reaction was completed, the resulting slurry was filtered to collect the powdery polymer. The polymer thus obtained was washed with acetone and dried under a reduced pressure to give white and granular particles having a good solubility in water. Yield, about 92 percent. Intrinsic viscosity, 19.0 (determined in an N aqueous solution of sodium nitrate at 30°C).

For comparison, the procedure was carried out in the same manner as above except that zinc chloride was not added to the reaction system. The slurry thus obtained was found to be flocculated in about 4 hours.

EXAMPLE 2

Acrylamide (195.5 g) and acrylic acid (43.2 g) were added to a mixture of 446 g of water and 192 g of acetone, and the resulting mixture was neutralized with about 50 ml of a 10N aqueous solution of sodium hydroxide. Then, 40 g of a 5 percent aqueous solution of polyvinyl alcohol and 0.2 g of zinc bromide were added thereto. After replacement of the atmosphere in the reaction vessel by nitrogen gas, 10 ml of a 1 percent aqueous solution of potassium persulfate and 10 ml of a 2 percent aqueous solution of triethanolamine were added thereto. The reaction was initiated within a few minutes, and the system which was first homogeneous and clear became turbid white with proceeding of the reaction. The polymerization was carried out at 10°C for 8 hours under the stream of nitrogen gas while stirring. After the polymerization reaction was completed, the procedure was carried out in the same manner as in Example 1 to obtain 230 g of the copolymer having a good solubility in water. Intrinsic viscosity, 25.2.

For comparison, the procedure was carried out in the same manner as above except that zinc bromide was not added to the reaction system. The slurry thus obtained was found to be flocculated in about 4 hours.

When the polymerization was carried out using tetramethylethylene diamine, tetramethylhexamethylene diamine or tetramethylpropylene diamine in place of triethanolamine, the copolymer having above 25.0 in intrinsic viscosity was obtained in a yield of above 90 percent.

EXAMPLE 3

A mixture of 154 g of acrylamide, 83.6 g of acrylic acid, 40 g of polyvinyl alcohol ("Gosenol GH-17," a registered trademark of Nihon Gosei Kagaku Co., Ltd.), 0.2 g of zinc chloride, 446 g of water and 192 g of acetone was neutralized with about 86 ml of a 10N aqueous solution of sodium hydroxide. To the resulting solution were added 10 ml of a 1 percent aqueous solution of sodium persulfate and 10 ml of a 2 percent aqueous solution of dimethylaminoethanol under a stream of nitrogen gas, and the polymerization was allowed to proceed at 15°C for 8 hours. The slurry thus obtained was filtered and dried in the same manner as in Example 1 to obtain the copolymer having a good solubility in water. Yield, 90 percent. Intrinsic viscosity, 22.0.

The procedure was carried out in the same manner as above except that zinc chloride was not added to the reaction system. The slurry thus obtained was unstable and susceptible to flocculation, and there was obtained the copolymer having 20.0 in intrinsic viscosity in a yield of 90 percent.

EXAMPLES 4 TO 6

The polymerization was carried out in the same manner as in Example 2 except that lithium chloride, aluminum bromide or antimony chloride was used in place of zinc bromide. The reaction proceeded very smoothly and gave the results as shown in Table 1.

Table 1

| Example No. | 4 | 5 | 6 |
|---|---|---|---|
| Lewis acid | Lithium chloride | Aluminum bromide | Antimony chloride |
| Yield (%) 30°C | 90.5 | 91.0 | 92.0 |
| $[\eta]$ NNaNO$_3$ | 22.5 | 23.0 | 23.5 |

What is claimed is:

1. A process for producing resinous polymers of acrylamide which comprises copolymerizing acrylamide with at least one monovinyl monomer selected from the group consisting of acrylonitrile, acrylic acid and its salts, methacrylic acid and its salts and vinylpyridine, the total amount of acrylamide and the monovinyl monomer being 20 to 30 percent by weight based on the total amount of the reaction mixture and the amount of acrylamide being 65 to 99 percent by weight based on the total amount of acrylamide and the monovinyl monomer, in a solvent mixture of water and acetone, said solvent mixture containing 23 to 30 percent by weight of acetone, in the presence of a redox type catalyst consisting essentially of at least one persulfate selected from the group consisting of potassium persulfate, sodium persulfate and ammonium persulfate, at least one aliphatic amine selected from the group consisting of dimethylaminoethanol, triethanolamine, hexamethylene diamine, diethylene triamine, triethylene tetramine, tetraethylene pentamine, polyethylenimine, tetramethylethylene diamine, tetramethylpropylene diamine and tetramethylhexamethylene diamine and at least one Lewis acid selected from the group consisting of the chlorides and bromides of aluminum, antimony, lithium and zinc, the weight ratio of the persulfate to the aliphatic amine being 1 : 0.5–2.5 and the weight ratio of the aliphatic amine to said Lewis acid being 1 : 0.5–3.0, the amount of said redox type catalyst being 0.01 to 1.0 percent by weight based on the total amount of acrylamide and the monovinyl monomer.

2. The process according to claim 1 wherein the copolymerization is effected in the presence of polyvinyl alcohol as a dispersing agent.

3. The process according to claim 2 wherein the amount of polyvinyl alcohol is 0.1 to 4 percent by weight based on the total amount of the reaction mixture.

* * * * *